US012671913B2

(12) United States Patent
Kim et al.

(10) Patent No.: US 12,671,913 B2
(45) Date of Patent: Jun. 30, 2026

(54) SEMICONDUCTOR DEVICE FOR PERFORMING LIGHT-BASED COMPUTATION AND OPERATION METHOD OF SEMICONDUCTOR DEVICE

(71) Applicant: SK hynix Inc., Icheon-si (KR)

(72) Inventors: Hyun Soo Kim, Icheon-si (KR); Jeong Hwan Song, Icheon-si (KR); Jun Hwe Cha, Icheon-si (KR); Youn Jae Song, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 235 days.

(21) Appl. No.: 18/532,856

(22) Filed: Dec. 7, 2023

(65) Prior Publication Data

US 2025/0063264 A1 Feb. 20, 2025

(30) Foreign Application Priority Data

Aug. 16, 2023 (KR) ........................ 10-2023-0106832

(51) Int. Cl.
*H04N 25/13* (2023.01)
*H04N 23/84* (2023.01)
*H04N 25/78* (2023.01)

(52) U.S. Cl.
CPC .......... *H04N 25/135* (2023.01); *H04N 23/84* (2023.01); *H04N 25/78* (2023.01)

(58) Field of Classification Search
None
See application file for complete search history.

(56) References Cited

U.S. PATENT DOCUMENTS

| | | | |
|---|---|---|---|
| 2002/0057431 A1* | 5/2002 | Fateley | .............. G02B 27/1013 356/330 |
| 2011/0285881 A1* | 11/2011 | Izuha | .................... H10F 39/806 257/432 |
| 2019/0064555 A1 | 2/2019 | Hosseini et al. | |
| 2021/0105423 A1* | 4/2021 | Miyakoshi | ........... H04N 25/583 |
| 2021/0303983 A1* | 9/2021 | Abel | ........................ G02F 1/19 |

FOREIGN PATENT DOCUMENTS

KR      10-2261857 B1      6/2021

* cited by examiner

*Primary Examiner* — Mark T Monk

(57) ABSTRACT

A semiconductor device may include a color filter array, an optical synapse array including a plurality of light passage paths transferring light incident through the color filter array with independently controlled transmissivities, and an optical-to-digital conversion circuit converting the transferred light through the plurality of light passage paths into digital data.

20 Claims, 11 Drawing Sheets

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

| P1 | P2 | P3 |
|----|----|----|
| P4 | P5 | P6 |
| P7 | P8 | P9 |

SEMICONDUCTOR DEVICE FOR PERFORMING LIGHT-BASED COMPUTATION AND OPERATION METHOD OF SEMICONDUCTOR DEVICE

CROSS-REFERENCE TO RELATED APPLICATION

This application claims priority under 35 U.S.C. § 119 to Korean Patent Application No. 10-2023-0106832 filed on Aug. 16, 2023, which is incorporated herein by reference in its entirety.

BACKGROUND

1. Technical Field

Embodiments of the present disclosure relate to a semiconductor device including a computation device and an image sensor, and more particularly, to a semiconductor device that performs light-based computation and then converts a result of the light-based computation into digital data.

2. Related Art

Image inference is one of the important technologies in the field of computer vision, and generally includes the following processes. First, a subject is sensed by an image sensor, such that digital data is generated. Then, the digital data generated by the image sensor is transferred to a processor, where multiply-accumulate (MAC) computation is performed and a result may be derived.

Because an image inference operation should be performed immediately, a high processing speed is required, and accordingly, a lot of energy is consumed. Accordingly, a technology that enables more efficient image inference is desirable for increasing a processing speed and reducing power consumption.

SUMMARY

In an embodiment, a semiconductor device may include: a color filter array; an optical synapse array including a plurality of light passage paths transferring light incident through the color filter array with independently controlled transmissivities; and an optical-to-digital conversion circuit converting the transferred light through the plurality of light passage paths into digital data.

The optical-to-digital conversion circuit may convert one or more values each obtained by summing the light transferred through specific ones of the plurality of light passage paths into the digital data.

In an embodiment, an operation method of a semiconductor device may include: receiving light through a color filter array; transferring the light received through the color filter array using a plurality of light passage paths each having a programmed transmissivity; and converting the light transferred through the plurality of light passage paths into digital data.

In converting the transferred light into digital data, one or more values each obtained by summing the light transferred through specific ones of the plurality of light passage paths may be converted into the digital data.

BRIEF DESCRIPTION OF THE DRAWINGS

FIG. 7 is a diagram illustrating a pixel array of an optical-to-digital conversion circuit according to an embodiment.

FIG. 8 is a diagram illustrating components of an optical-to-digital conversion circuit related to pixels of a pixel array, according to an embodiment.

DETAILED DESCRIPTION

Various embodiments are directed to a technology capable of efficiently performing image inference.

According to embodiments of the present disclosure, it is possible to efficiently perform an image inference operation.

Hereafter, embodiments in accordance with the technical spirit of the present disclosure will be described with reference to the accompanying drawings.

Figure 1:
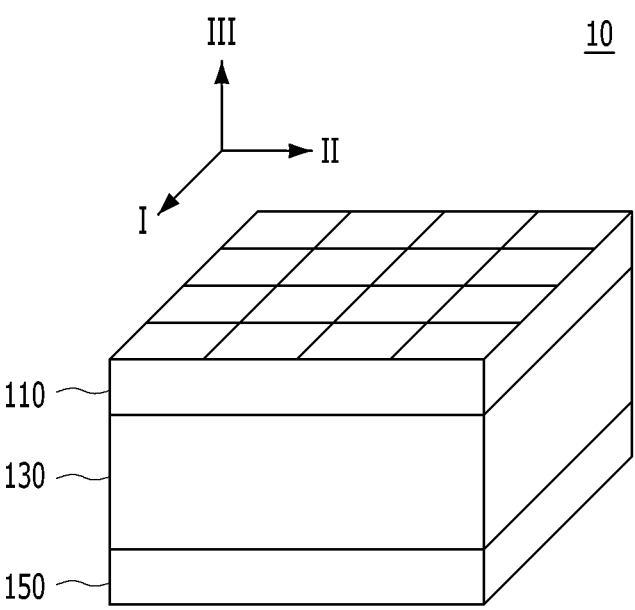
FIG. 1 is a configuration diagram of a semiconductor device in accordance with an embodiment.

FIG. 1 is a configuration diagram of a semiconductor device 100 in accordance with an embodiment.

Referring to FIG. 1, the semiconductor device 100 may include a color filter array 110, an optical synapse array 130, and an optical-to-digital conversion circuit 150. In FIG. 1, some elements (e.g., control lines of the optical synapse array 130 and peripheral circuits of the optical-to-digital conversion circuit 150) are not been illustrated in order to clearly indicate regions where light is transferred in the color filter array 110, the optical synapse array 130, and the optical-to-digital conversion circuit 150.

Figure 2:
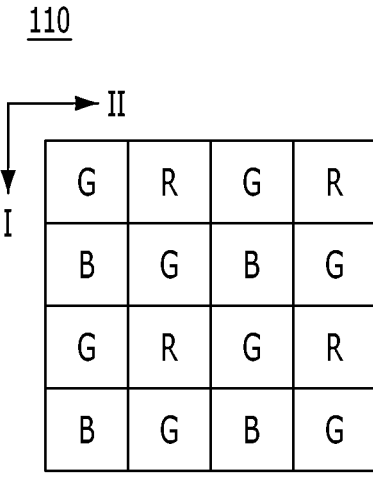
FIG. 2 is a top view of a color filter array according to an embodiment.

Light from a subject may be input through the color filter array 110. For example, the color filter array 110 is a mosaic filter used to obtain color information. FIG. 2 is a top view of a color filter array 110 according to an embodiment. Referring to FIG. 2, the color filter array 110 may include a plurality of repeated units, each of which consists of 2×2 square filters (two green filters G, one red filter R, and one blue filter B). A filter arranged in an RGGB form in this way is called a Bayer filter. In addition to the Bayer filter, various types of filters in which a type or the number of used color filters are changed may be used according to embodiments. Only sixteen filters have been illustrated in FIG. 2 for convenience of explanation, but the color filter array 110 may include a greater number of filters (e.g., millions or tens of millions of filters).

The optical synapse array 130 may include a plurality of light passage paths for transferring light incident through the color filter array 110 with independently controlled transmissivities. In other words, each of the plurality of light passage paths may transmit incident light thereon with a transmissivity that is adjustable independently from other light passage paths. Having an adjustable transmissivity of each the plurality of light passage paths may be described as applying a weight to light. For example, it may be considered that a weight of a high value has been applied to light passing through a light passage path having a high transmissivity, and a weight of a low value has been applied to light passing through a light passage path having a low transmissivity.

The optical-to-digital conversion circuit 150 may convert the light passing through the light passage paths of the optical synapse array 130 into digital data. The optical-to-digital conversion circuit 150 may convert values obtained by summing the light transferred through several light passage paths into the digital data. That is, values multiplied by the weights by the optical synapse array 130 may be summed and converted into the digital data. Ultimately, the digital data is data obtained by converting values obtained by multiplying the light incident from the subject onto the color filter array 110 by various weights and summing values to which the weights are applied, that is, values obtained by performing multiply-accumulate (MAC) computation on the light, into a digital form.

Figure 3:
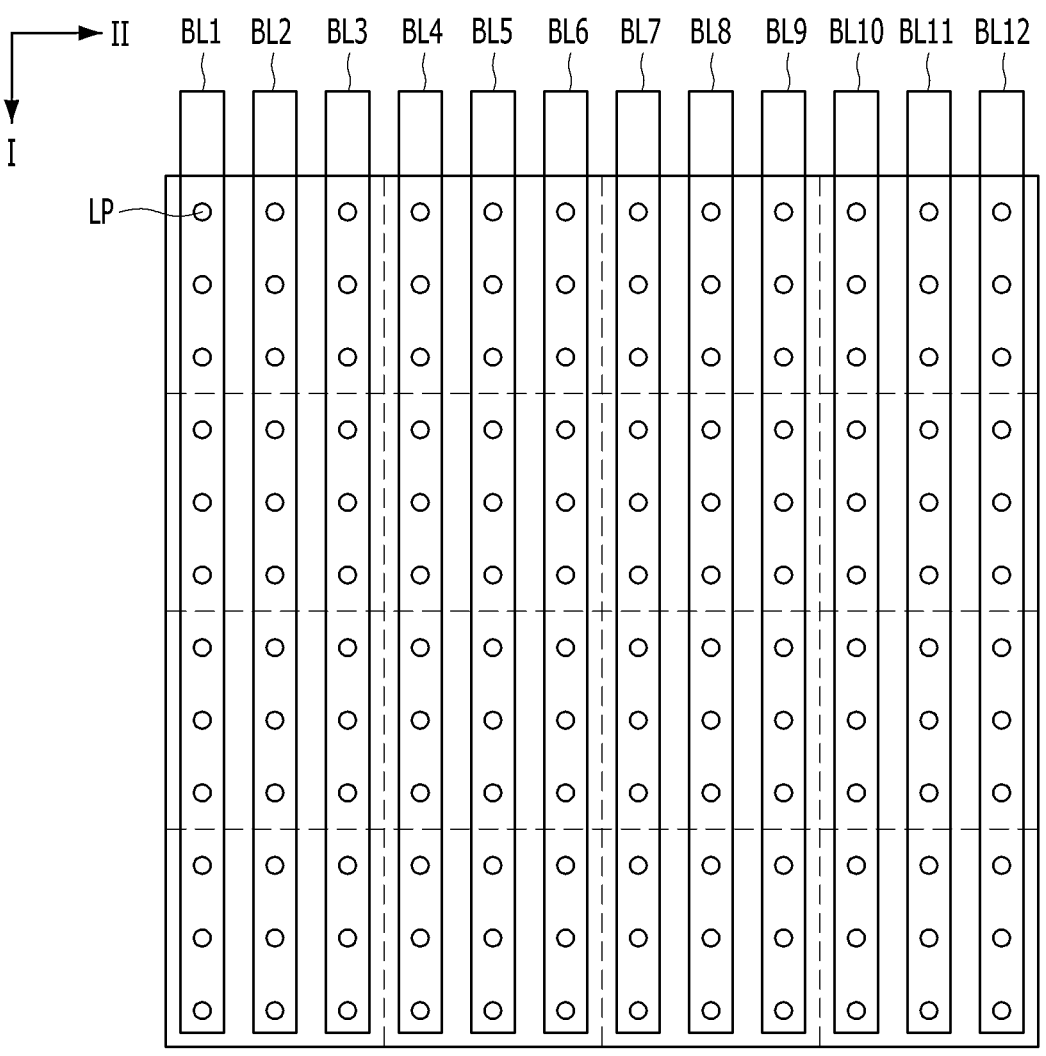
FIG. 3 is a top view of an optical synapse array according to an embodiment.

FIG. 3 is a top view of the optical synapse array 130 of FIG. 1 according to an embodiment.

Referring to FIG. 3, the optical synapse array 130 may include a plurality of light passage paths LP and bit lines BL1 to BL12 for controlling the plurality of light passage paths LP. Dotted lines in FIG. 3 indicate positions of the color filters in order to indicate corresponding relationships with the filters of the color filter array 110. In the embodiment of FIG. 3, nine light passage paths LP correspond to each filter of the color filter array 110. That is, light incident onto one color filter may be transferred to the optical-to-digital conversion circuit 150 through nine light passage paths LP. In this case, because a transmissivity of each of the light passage paths LP is programmable, even though light is incident on the same color filter, an amount of light may be different depending on which of the nine light passage paths LP the light passes through.

Figure 4:
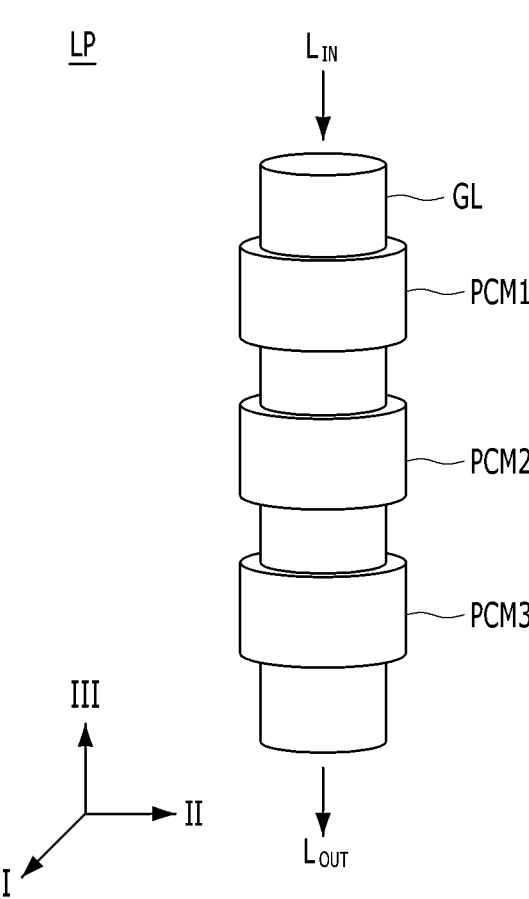
FIG. 4 is a diagram illustrating one light passage path according to an embodiment.

FIG. 4 is a diagram illustrating a single light passage path LP suitable for use as the light passage path LP in FIG. 3, according to an embodiment.

Referring to FIG. 4, the light passage path LP may include a light guide line GL and phase change materials PCM1 to PCM3.

The light guide line GL may be a line for transferring the incident light while internally reflecting the incident light. The light guide line GL is preferably made of a material having conductivity while transmitting the light therethrough. For example, the light guide line GL may have an electrical conductivity sufficient to function as an electrode to change the state of the phase change materials PCM1 to PCM3 together with a conductive line (e.g., a word line) while having a transmissivity sufficient to function as an optical path to transmit the light therethrough. The following materials may be used as a material of the light guide line GL. (1) Silicon: By doping silicon with an appropriate concentration of impurities, an optical guide line transmitting light therethrough while having electrical conductivity may be implemented. (2) Special glass: By doping a special glass material having significantly higher optical transmissive properties and light guiding properties than general glass with metal or non-metal atoms, a light guide line having electrical conductivity while transferring light may be implemented. (3) Semiconductor nanostructure: A nanolevel semiconductor structure may have electrical conductivity while serving as an optical guide line guiding light.

The phase change materials PCM1 to PCM3 may be formed to surround an outer wall of the light guide line GL. The phase change materials PCM1 to PCM3 are programmable and may have different reflectivities depending on programmed states. For example, each of the phase change materials PCM1 to PCM3 may be programmed to one of a crystalline state and an amorphous state, and may have a relatively high reflectivity ($R_C$) when it is in the crystalline state and have a relatively low reflectivity ($R_A$) when it is in the amorphous state. Specifically, each of the phase change materials PCM1 to PCM3 may have a first reflectivity ($R_C$) when it is in the crystalline state and has a second reflectivity ($R_A$) when it is in the amorphous state, where the first reflectivity is higher than the second reflectivity. It has been described by way of example in FIG. 4 that the light passage path LP includes three phase change materials PCM1 to PCM3, but the number of phase change materials included in the light passage path LP may vary according to embodiments.

It is preferable that a portion of the outer wall of the light guide line GL that is not covered by the phase change materials PCM1 to PCM3 is surrounded by a material capable of total reflection with a high reflectivity. Specifically, a specific material may surround one or more portions of the outer walls exposed by the phase change materials PCM1 to PCM3 and have a reflectivity sufficiently high to cause total reflection at an interface between the specific material and the outer wall of the light guide line GL.

Figure 5A:
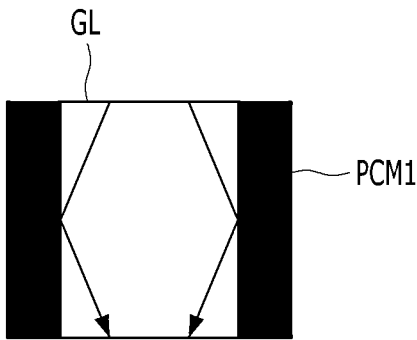
FIGS. 5A and 5B are diagrams each illustrating transfer of light in a light guide line.
Figure 5B:
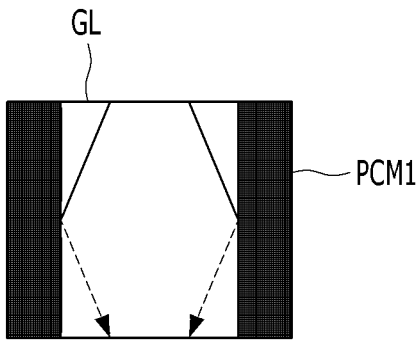

FIG. 5A illustrates the transfer of light in a phase change material PCM1 portion of the light guide line GL when the phase change material PCM1 is in a first state (e.g., the crystalline state). Referring to FIG. 5A, it may be confirmed that most of the light is transferred while being reflected by the phase change material PCM1. FIG. 5B illustrates the transfer of light in the phase change material PCM1 portion of the light guide line GL when the phase change material PCM1 is in a second state (e.g., the amorphous state). Referring to FIG. 5B, it may be confirmed that some of the light is transferred without being reflected by the phase change material. In other words, referring to FIG. 5B, the phase change material PCM1 may transmit a significant amount of incident light therethrough and reflect the remaining amount of the incident light to the light guide line GL at an interface between the phase change material PCM1 and the light guide line GL. As a result, only some of the light received by a first end of the light guide line GL may be transmitted to a second end of the light guide line GL.

Referring to FIG. 4 again, when a reflectivity of the phase change materials PCM1 to PCM3 when the phase change materials PCM1 to PCM3 are in the crystalline state is $R_C$ and a reflectivity of the phase change materials PCM1 to PCM3 when the phase change materials PCM1 to PCM3 are in the amorphous state is $R_A$, light $L_{IN}$ input to the light guide line GL and light $L_{OUT}$ output from the light guide line GL may have one relationship of the following Cases (1) to (4).

Case (1) [All of three phase change materials PCM1 to PCM3 are in amorphous state]: $L_{OUT}=L_{IN}*(R_A)^3$ Case (2) [Two of phase change materials PCM1 to PCM3 are in amorphous state and one of phase change materials PCM1 to PCM3 is in crystalline state]: $L_{OUT}=L_{IN}*(R_A)^2*(R_C)$ Case (3) [One of phase change materials PCM1 to PCM3 is in amorphous state and two of phase change materials PCM1 to PCM3 are in crystalline state]: $L_{OUT}=L_{IN}*(R_A)*(R_C)^2$ Case (4) [All of three phase change materials PCM1 to PCM3 are in crystalline state]: $L_{OUT}=L_{IN}*(R_C)^3$ That is, one of four weights [$(R_A)^3$, $(R_A)^2*(R_C)$, $(R_A)*(R_C)^2$, and $(R_C)^3$] may be applied between the light $L_{IN}$ input to and the light $L_{OUT}$ output from the light passage path LP. Specifically, the light $L_{IN}$ and the light $L_{OUT}$ each may indicate optical power (e.g., energy of light per unit time).

Figure 6:
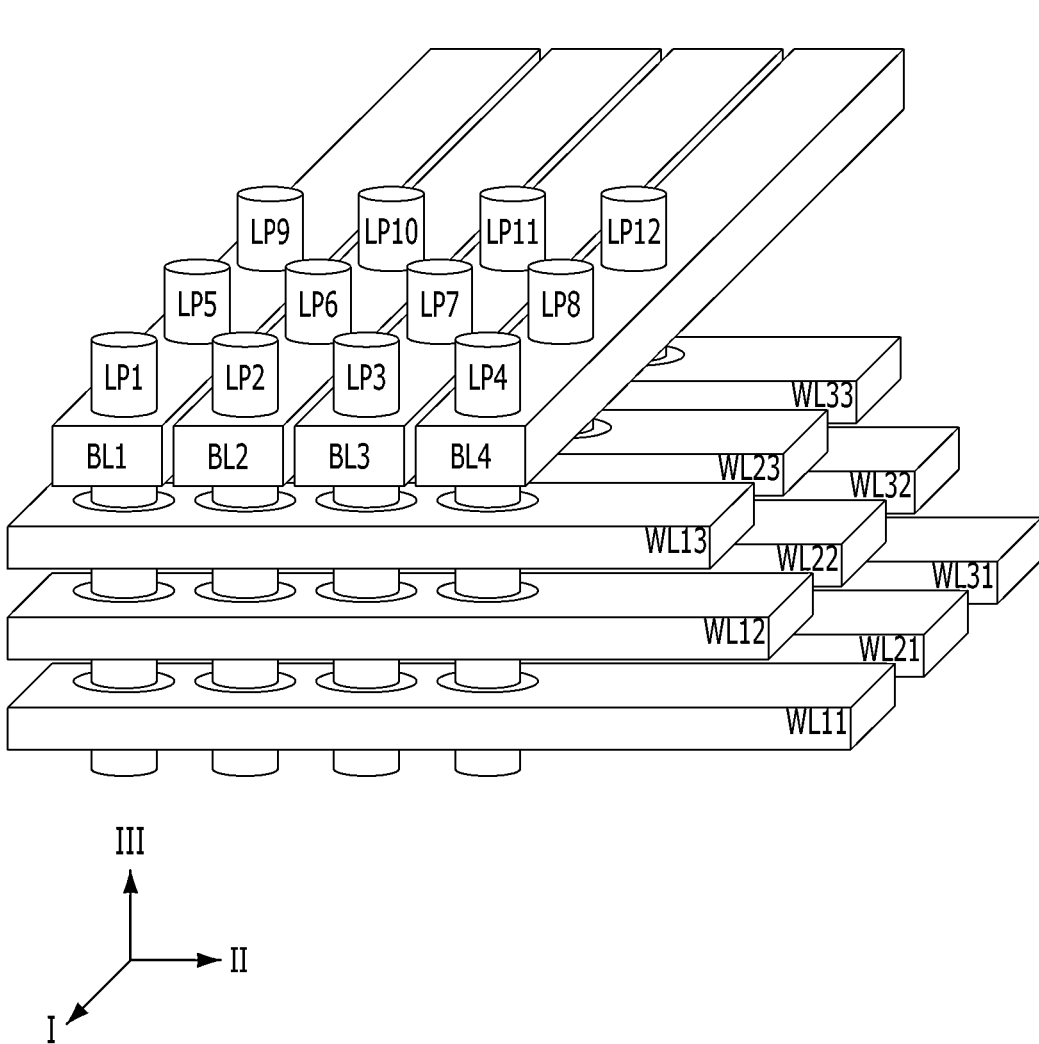
FIG. 6 is a perspective view of the optical synapse array according to an embodiment.

FIG. 6 is a perspective view of the optical synapse array 130 according to an embodiment. In order to illustrate the optical synapse array in more detail, only a portion of the optical synapse array 130 has been illustrated in FIG. 6.

Referring to FIG. 6, bit lines BL1 to BL4 may be formed to surround light guide lines GL of upper end portions of light passage paths LP1 to LP12. For example, each (e.g., BL1) of the bit lines BL1 to BL4 extends in a first direction I and is formed to surround upper end portions of a group of light passage paths (e.g., LP1, LP5, and LP9) arranged in the first direction I. That is, the bit lines BL1 to BL4 may be electrically connected to the light guide lines GL. Word lines WL11 to WL33 may be formed to surround phase change materials PCM of the light passage paths LP. For example, each (e.g., WL11) of the word lines WL11 to WL33 extends in a second direction II and is formed to surround portions of a group of light passage paths (e.g., LP1, LP2, LP3, and LP4) that are arranged in the second direction II and disposed at substantially the same level in a third direction III.

The bit lines BL1 to BL4 and the word lines WL11 to WL33 may be used to program the phase change materials PCM included in the light passage paths LP of the optical synapse array 130, and when the phase change materials PCM are distinguished from each other by (I, II, III) coordinates, the bit lines BL1 to BL4 may select II coordinates, and the word lines WL11 to WL33 may select I coordinates and III coordinates.

Each of the phase change materials PCM may be selected using the bit lines BL1 to BL4 and the word lines WL11 to WL33, and it may be thus possible to program each of the phase change materials PCM to a desired value. For example, it is possible to program a phase change material PCM of a middle portion of the light passage path LP1 using the bit line BL1 and the word line WL12, it is possible to program a phase change material PCM of an upper portion of the light passage path LP7 using the bit line BL3 and the word line WL23, and it may be possible to program a phase change material PCM of a lower portion of the light passage path LP12 using the bit line BL4 and the word line WL31.

The programming of the phase change materials PCM may be performed by applying a signal (e.g., a current) of appropriate intensity for an appropriate time in order to program the phase change materials PCM using the bit lines BL1 to BL4 and the word lines WL11 to WL33 connected to the phase change materials PCM. For example, an inner surface of the phase change material PCM may be connected to an outer surface of a light passage path having an upper end portion connected to a bit line, and an outer surface of the phase change material PCM may be connected to an inner surface of a word line. Here, the intensity of the current and a length of the time for which the current is applied may be different when the phase change material PCM is programmed to the crystalline state and when the phase change material PCM is programmed to the amorphous state.

FIG. 7 is a diagram illustrating a pixel array 710 of the optical-to-digital conversion circuit 150 of FIG. 1 according to an embodiment.

The optical-to-digital conversion circuit 150 includes a pixel array 710 for receiving the light transferred from the optical synapse array 130. The optical-to-digital conversion circuit 150 may further include lines and peripheral circuits for controlling the pixel array 710, but only the pixel array 710 of the optical-to-digital conversion circuit 150 has been illustrated in FIG. 7. Dotted lines in FIG. 7 are used to indicate corresponding relationships between the filters of the color filter array 110 and the light passage paths LP of the optical synapse array 130. In the embodiment of FIG. 7, nine pixels P of the pixel array 710 may correspond to each filter of the color filter array 110, and the pixels P of the pixel array 710 may correspond to the light passage paths LP of the optical synapse array 130 in a one-to-one manner. In other words, each of the pixels P of the pixel array 710 may be coupled to a corresponding one of the light passage paths LP of the optical synapse array 130.

Numerals are added to the pixels P, and are used to group pixels P of which sensing results are summed. For example, a first result may be derived by summing sensing results of sixteen first pixels P1 in FIG. 7, and a second result may be derived by summing sensing results of sixteen second pixels P2 in FIG. 7.

Figure 8:
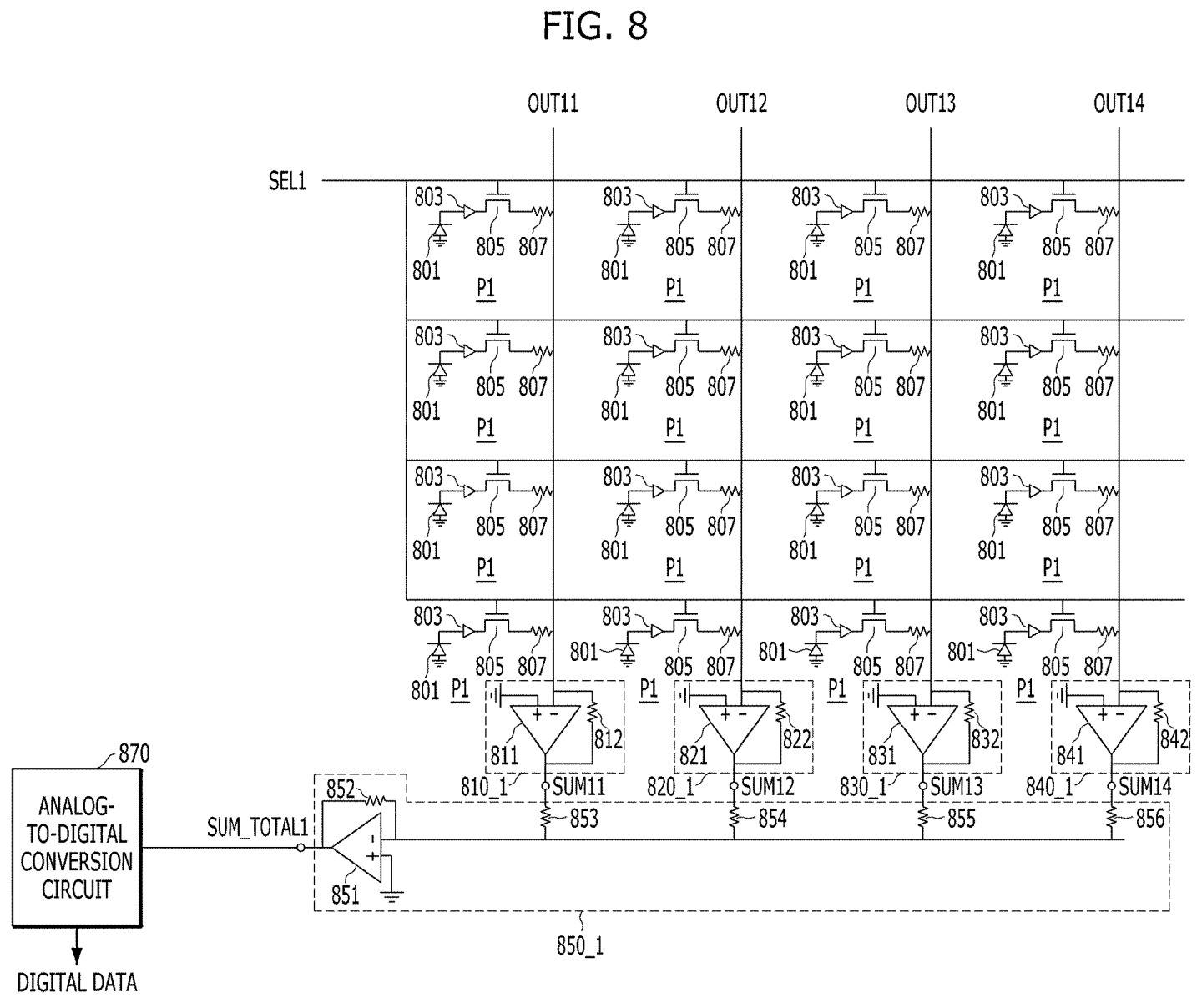

FIG. 8 is a diagram illustrating components of the optical-to-digital conversion circuit 150 related to pixels P1 of the pixel array 710 according to an embodiment. For example, FIG. 8 shows circuit elements associated with sixteen first pixels P1 of the pixel array 710 in FIG. 7.

A select line SEL1 may be a line used to select the pixels P1. Output lines OUT11 to OUT14 may be lines used to output the sensing results of the pixels P1. The select line SEL1 and the output lines OUT11 to OUT14 may be lines dedicated to the pixels P1 of the pixel array 710. The pixels P2 may use a dedicated select line SEL2 (not illustrated) and dedicated output lines OUT21 to OUT24 (not illustrated) different from the lines of the pixels P1. Likewise, pixels P3 to P9 may also use their dedicated select lines SEL3 to SEL9 (not illustrated) and output lines OUT31 to OUT34, OUT41 to OUT44, OUT51 to OUT54, OUT61 to OUT64, OUT71 to OUT74, OUT81 to OUT84, and OUT91 to OUT94 (not illustrated), respectively.

Each of the pixels P1 may include a photodiode 801, an amplifier 803, a select transistor 805, and a resistor 807. The photodiode 801 may generate a current corresponding to an amount of received light, and the amplifier 803 may amplify and output a voltage generated by the current of the photodiode 801. When a signal of the select line SEL1 is activated to have a first value (e.g., a high level), the select transistor 805 in each of the pixels P1 may be turned on to output the voltage amplified by the amplifier 803 to the output lines OUT11 to OUT14 through the resistor 807. The pixels P2 to P9 (not illustrated in FIG. 8) may also be configured in substantially the same manner as the pixel P1.

Summing circuits 810_1 to 850_1 may sum output voltages of the pixels P1. Each of the summing circuits 810_1 to 840_1 may sum voltages generated from four pixels and output through each of the output lines OUT11 to OUT14 to generate each of voltages SUM11 to SUM14, and the summing circuit 850_1 may sum four voltages SUM11 to SUM14 output from the summing circuits 810_1 to 840_1 to generate an output voltage SUM_TOTAL1. An output voltage SUM_TOTAL1 of the summing circuit 850_1 may be the sum of the output voltages of the sixteen pixels P1. Each of the summing circuits 810_1 to 850_1 may be a summing amplifier (or summation amplifier). The summing circuits 810_1 to 840_1 may include operational amplifiers 811, 821, 831, and 841 and resistors 812, 822, 832, and 842, respectively. Each of the summing circuits 810_1 to 840_1 may function as a summation amplifier together with the resistor 807 of each of the pixels P1. The summing circuit 850_1 may include an operational amplifier 851 and resistors 852 to 856, and may also operate as a summation amplifier to sum and output the output voltages SUM11 to SUM14 of the summing circuits 810_1 to 840_1. The summing circuits 810_1 to 850_1 may be dedicated to the pixels P1. Summing circuits 810_2 to 850_2 (not illustrated) for summing output voltages of the pixels P2 may exist separately, and likewise, summing circuits 810_3 to 850_3, 810_4 to 850_4, 810_5 to 850_5, 810_6 to 850_6, 810_7 to 850_7, 810_8 to 850_8, and 810_9 to 850_9 for summing output voltages of the pixels P3 to P9, respectively, may exist separately.

An analog-to-digital conversion circuit 870 may generate digital data DIGITAL DATA by converting the output voltage SUM_TOTAL1 of the summing circuit 850_1 from an analog form and a digital form. The analog-to-digital conversion circuit 870 may have a component common to all pixels P1 to P9. The analog-to-digital conversion circuit 870 may convert the voltage SUM_TOTAL1 obtained by summing the output values (e.g., voltages) of the pixels P1 from an analog form into a digital form in a section in which the signal of the select line SEL1 is activated, and convert a voltage SUM_TOTAL2 obtained by summing the output voltages of the pixels P2 from an analog form into a digital form in a section in which a signal of the select line SEL2 is activated. Likewise, the analog-to-digital conversion circuit 870 may convert voltages SUM_TOTAL3 to SUM_TO-TAL9 obtained by summing the output voltages of the pixels P3 to P9 from an analog form into a digital form in sections in which signals of the select lines SEL3 to SEL9 are activated.

Figure 9:
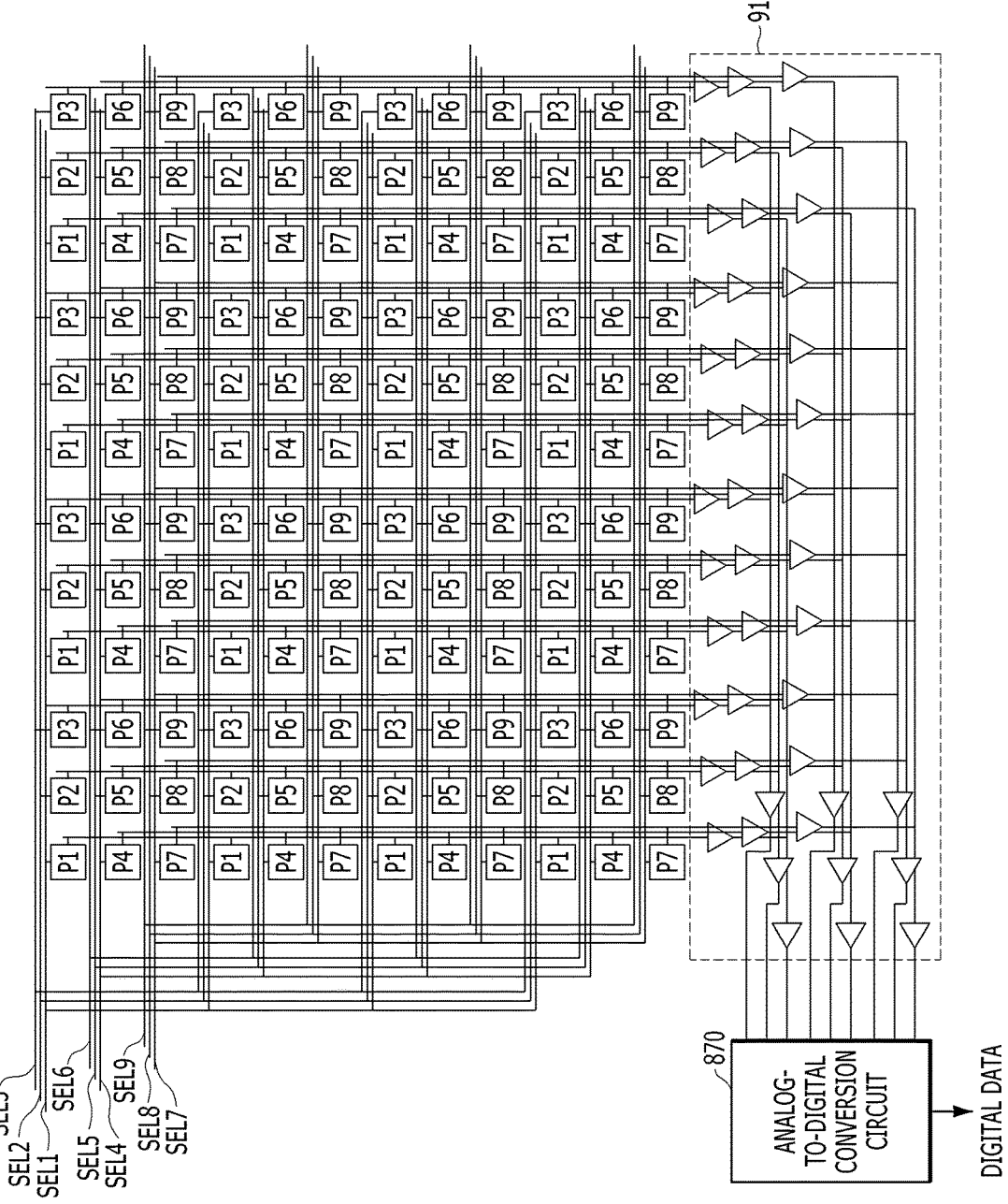
FIG. 9 is a diagram illustrating an entire configuration of an optical-to-digital conversion circuit according to an embodiment.

FIG. 9 is a diagram illustrating an entire configuration of the optical-to-digital conversion circuit 150 according to an embodiment.

Referring to FIG. 9, the optical-to-digital conversion circuit 150 includes pixels P1 to P9, nine select lines SEL1 to SEL9 for selecting the pixels P1 to P9, 36 output lines (e.g., output lines OUT11 to OUT14 shown in FIG. 8, symbols of the 36 output lines are omitted in FIG. 9 due to lack of space) for outputting data of the pixels P1 to P9, 45 summing circuits 910 (e.g., summing circuits 810_1 to 850_1 in FIG. 8), and an analog-to-digital conversion circuit 870.

Figure 10:
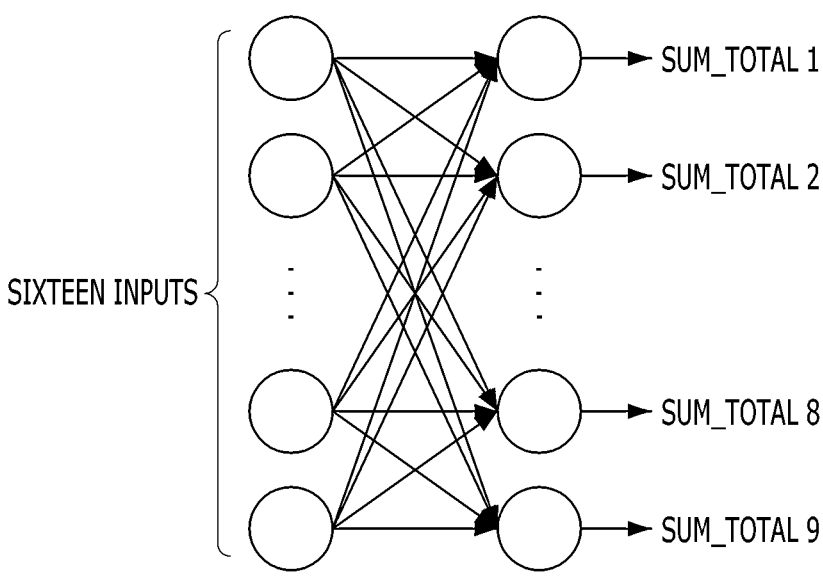
FIG. 10 is a diagram illustrating computation performed by a semiconductor device according to an embodiment.

FIG. 10 is a diagram illustrating computation performed by a semiconductor device (e.g., the semiconductor device 100 of FIG. 1) according to an embodiment.

Referring to FIG. 10, sixteen inputs may indicate light input by the sixteen filters of the color filter array 110. Programmable weights may be applied to the sixteen inputs by the optical synapse array 130. The optical synapse array 130 may apply nine different weights to each of the sixteen inputs. Consequently, 144 values to which the weights are applied may be generated. The optical-to-digital conversion circuit 150 may generate nine summed voltages SUM_TO-TAL1 to SUM_TOTAL9 by adding the 144 values in units of sixteen values, and generate digital data DIGITAL DATA by converting the nine summed voltages SUM_TOTAL1 to SUM_TOTAL9 from an analog form into a digital form. In other words, a plurality of groups may be determined based on a plurality of pixels to make each of the groups include specific ones of the values. For example, the 144 values are grouped into nine groups respectively corresponding to nine pixels P1 to P9 to make each of the nine groups include sixteen values. The optical-to-digital conversion circuit 150 may sum sixteen values in each of the nine groups, thereby generating the nine summed voltages SUM_TOTAL1 to SUM_TOTAL9.

As a result, the digital data DIGITAL DATA may be a result obtained by performing multiply-accumulate (MAC) computation on an image input to the color filter array 110.

The semiconductor device 100 may perform the MAC computation on the image through a process of applying the weights to the light, electrically converting the light, summing converted values, and converting the summed value from an analog form into a digital form. Because important computation is performed based on the light, a speed of the computation may be increased and current consumption required for the computation may be reduced. Specifically, a conventional semiconductor device converts optical signals into digital data, transfers the converted data to a separate circuitry (e.g., a processor), and then performs multiply-accumulate (MAC) operations in the processor to generate output signals. A semiconductor device (e.g., the semiconductor device 100) according to an embodiment of the present disclosure may perform multiplication operations directly on optical signals, convert the optical signals into electrical signals, and perform accumulation operations on the electric signals without transferring the electrical signals to a separate circuitry (a processor) from the semiconductor device. Accordingly, an operation speed of the semiconductor device according to an embodiment may be increased and current consumption for the computation may be reduced, compared to a conventional semiconductor device.

Although embodiments according to the technical idea of the present disclosure have been described above with reference to the accompanying drawings, this is only for explaining the embodiments according to the concept of the present disclosure, and embodiments of the present disclosure are not limited to the above embodiments. Various types of substitutions, modifications, and changes for the embodiments may be made by those skilled in the art, to which the present disclosure pertains, without departing from the technical idea of the present disclosure defined in the following claims, and it should be construed that these substitutions, modifications, and changes belong to the scope of the present disclosure.

What is claimed is:

1. A semiconductor device comprising:
   a color filter array;
   an optical synapse array including a plurality of light passage paths, the plurality of light passage paths transferring light incident through the color filter array with independently controlled transmissivities, the transmissivities being determined according to program results of one or more phase change materials included in each of the plurality of light passage paths; and
   an optical-to-digital conversion circuit converting the transferred light through the plurality of light passage paths into digital data.

2. The semiconductor device of claim 1, wherein the optical-to-digital conversion circuit converts one or more values each obtained by summing the light transferred through specific ones of the plurality of light passage paths into the digital data.

3. The semiconductor device of claim 2, wherein each of the plurality of light passage paths of the optical synapse array comprises:
   a light guide line transferring the incident light, and
   wherein the one or more phase change materials surround an outer wall of the light guide line.

4. The semiconductor device of claim 3, wherein each of the one or more phase change materials is programmable, and has a reflectivity adjusted according to a programmed state.

5. The semiconductor device of claim 4, wherein a portion of the outer wall of the light guide line that is exposed by the one or more phase change materials is surrounded by a specific material with a reflectivity sufficiently high to cause total reflection between the specific material and the outer wall of the light guide line.

6. The semiconductor device of claim 4, wherein each of the one or more phase change materials has one of a crystalline state and an amorphous state according to a program result, and wherein each of the one or more phase change materials has a first reflectivity when it is in the crystalline state and has a second reflectivity when it is in the amorphous state, the first reflectivity being higher than the second reflectivity.

7. The semiconductor device of claim 3, wherein the optical synapse array includes a plurality of word lines and a plurality of bit lines, and wherein the phase change materials of the plurality of light passage paths are electrically connected between the plurality of word lines and the plurality of bit lines.

8. The semiconductor device of claim 7, wherein the phase change materials include a first phase change material connected to a first word line and a first bit line and a second phase change material connected to a second word line and a second bit line, and wherein the first word line is different from the second word line, or the first bit line is different from the second bit line, or both.

9. The semiconductor device of claim 8, wherein an inner surface of the first phase change material is connected to a corresponding light passage path having an end portion connected to the first bit line, and an outer surface of the first phase change material is connected to an inner surface of the first word line.

10. The semiconductor device of claim 7, wherein each of the plurality of bit lines extends in a first direction and surrounds end portions of a first group of the light passage paths arranged in the first direction, and wherein each of the plurality of word lines extends in a second direction intersecting the first direction and surrounds portions of a second group of the light passage paths arranged in the second direction.

11. The semiconductor device of claim 2, wherein the optical-to-digital conversion circuit comprises:

a plurality of pixels converting light transferred thereto into voltages, the plurality of pixels corresponding to the plurality of light passage paths in a one-to-one manner;

a plurality of summing circuits summing the voltages of output from the plurality of pixels; and an analog-to-digital conversion circuit converting the summed voltages into the digital data.

12. The semiconductor device of claim 11, wherein each of the plurality of pixels comprises:

a photodiode;

an amplifier amplifying an output voltage of the photodiode;

a resistor having one end connected to an output line; and a transistor transferring the amplified voltage of the amplifier to the other end of the resistor in response to a level of a select line.

13. The semiconductor device of claim 11, wherein each of the summing circuits includes one or more summing amplifiers.

14. The semiconductor device of claim 2, wherein the optical-to-digital conversion circuit comprises a plurality of pixels converting light transferred thereto into voltages, and wherein the specific ones of the plurality of light passage paths are included in each of a plurality of groups, and the plurality of groups are determined based on the plurality of pixels.

15. The semiconductor device of claim 1, wherein each of the plurality of light passages paths has a corresponding one of the transmissivities.

16. An operation method of a semiconductor device, the operation method comprising:

receiving light through a color filter array;

transferring the light received through the color filter array using a plurality of light passage paths, each of the plurality of light passage paths having a programmed transmissivity; and converting the light transferred through the plurality of light passage paths into digital data, wherein each of the plurality of light passage paths includes one or more phase change materials, and wherein transmissivities of the plurality of light passage paths are determined according to program results of the one or more phase change materials.

17. The operation method of claim 16, wherein in converting the transferred light into digital data, one or more values each obtained by summing the light transferred through specific ones of the plurality of light passage paths are converted into the digital data.

18. The operation method of claim 16, wherein converting the transferred light into digital data comprises:

converting light transferred to the plurality of light passage paths into voltages;

generating summed voltages, each of the summed voltages being obtained by summing specific ones of the converted voltages in each of a plurality of groups; and generating the digital data by converting the summed voltages from an analog form into a digital form.

19. The operation method of claim 18, wherein the plurality of groups are determined based on a plurality of pixels.

20. The operation method of claim 16, further comprising, before receiving the light, adjusting a transmissivity of each of the plurality of light passage paths by programming phase change materials included in each of the plurality of light passage paths.

* * * * *